S. O. EDMONDS.
TRACTION ATTACHMENT FOR MOTOR VEHICLES.
APPLICATION FILED DEC. 18, 1917.
1,266,781.
Patented May 21, 1918.
2 SHEETS—SHEET 2.
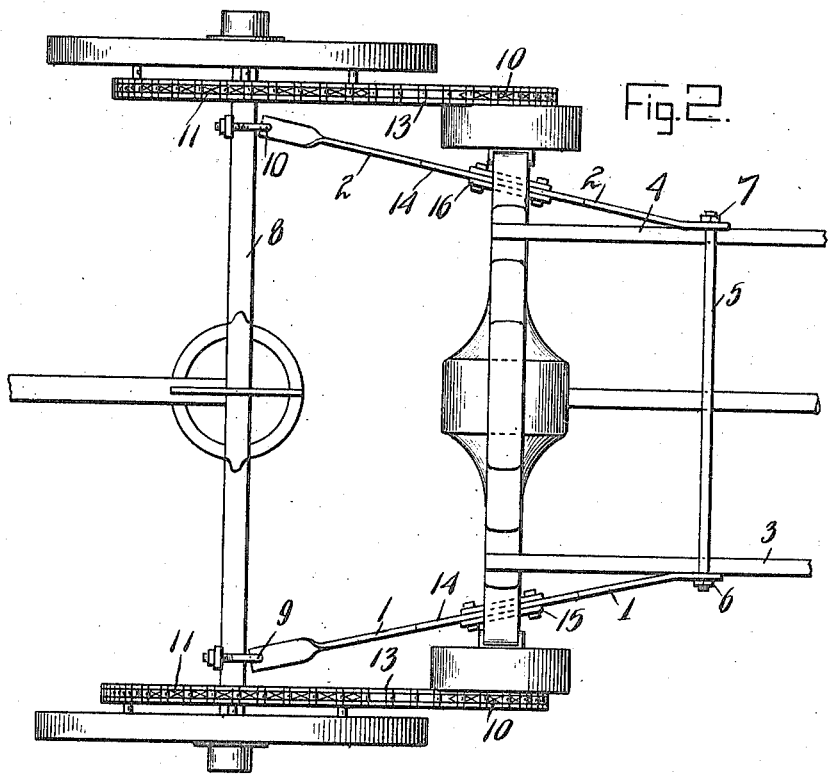
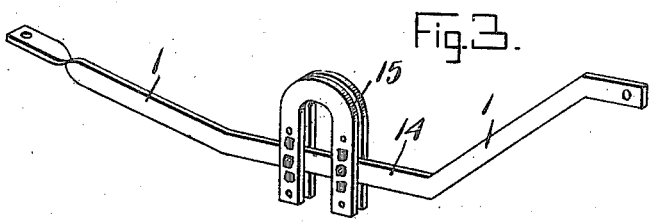

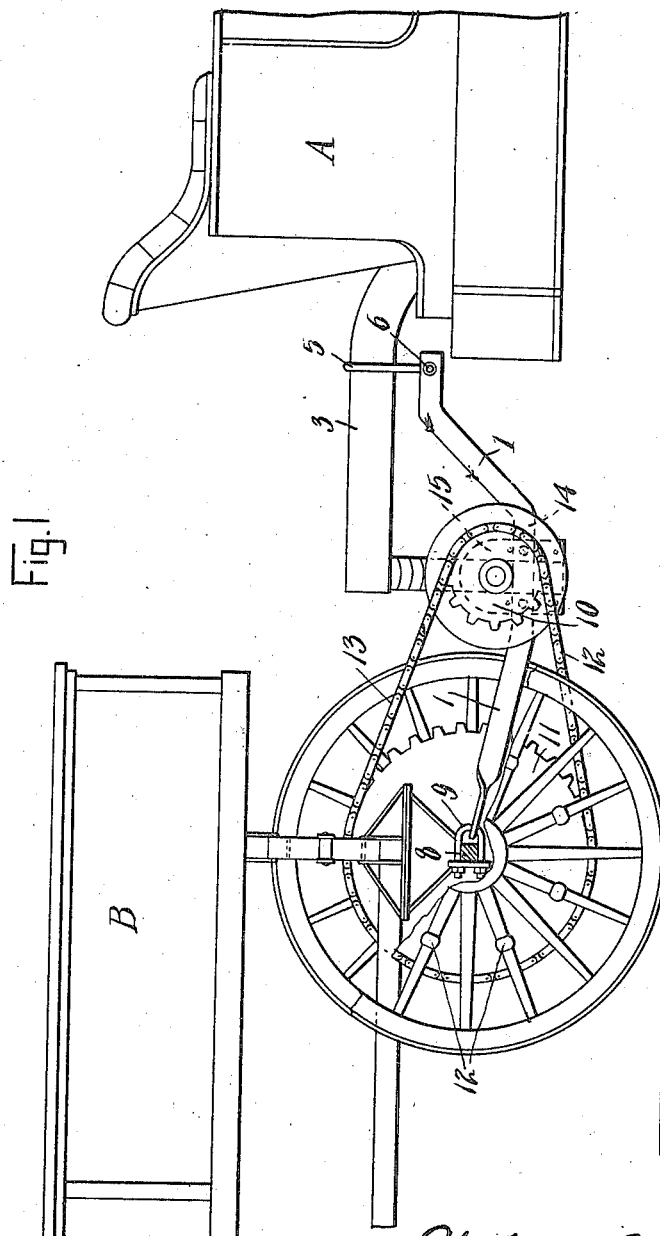

UNITED STATES PATENT OFFICE.

STERLING OWEN EDMONDS, OF EAGLEVILLE, TENNESSEE.

TRACTION ATTACHMENT FOR MOTOR-VEHICLES.

1,266,781. Specification of Letters Patent. Patented May 21, 1918.

Application filed December 18, 1917. Serial No. 207,719.

*To all whom it may concern:*

Be it known that I, STERLING O. EDMONDS, a citizen of the United States, residing at Eagleville, in the county of Rutherford and State of Tennessee, have invented certain new and useful Improvements in Traction Attachments for Motor-Vehicles, of which the following is a specification.

This invention relates in general to a traction attachment for motor vehicles and particularly to an attachment whereby two existing vehicles may be employed, one as a towing vehicle and the other as a towed vehicle.

The primary object of the invention is to provide means, whereby an existing motor vehicle, either of the conventional pleasure type, or a conventional commercial type may be employed as a tractor, without materially changing the construction or arrangement of parts thereof.

A further object of the invention is to accomplish the first-named object in a simple and practical manner.

With reference to the accompanying drawings—

Figure 1 is a side elevation of the rear part of the conventional type of motor vehicle and the front part of a wagon and illustrating the application of the invention.

Fig. 2 is a top plan view of the rear construction of a conventional motor vehicle or part of the front arrangement of the conventional wagon and illustrating the application of the invention; and Fig. 3 is a perspective view of the combined supporting and coupling structure.

Referring to the drawings in detail, the application of the invention is here illustrated as used in connection with a conventional type of motor vehicle, such as A and a conventional type of wagon, such as B, although the invention may be just as readily applied and used in connection with other types of existing motor vehicles and other types of vehicles desired to be towed, or if desired, farm implements may be attached to the tractor.

In carrying out the invention it is proposed to do away with the rear or traction wheels of the motor vehicle, hereinafter termed the towing vehicle, and to support the rear portion thereof on the axle or front structure of the vehicle to be towed, and to provide a suitable drive connecting the driving axle of the towing vehicle with the traction wheels of the vehicle to be towed. To accomplish this end a combined supporting and coupling structure is provided, which in its present preferred form comprises a pair of sling members 1 and 2, having inclined forward ends adapted to be connected to and supported from the frame members 3 and 4 of the towing vehicle, preferably at a point somewhat forward of the rear axle thereof. This connecting means comprises a U-shaped hanger 5 which reaches from the frame members 3, to the frame member 4 and overlies them with its ends turned down and secured to the ends of the sling members 1 and 2, through the medium of bolts 6 and 7, which enables the sling members to work on a pivot at this point. The opposite or rear ends of these sling members 1 and 2 are secured to the axle 8 of the towed vehicle by a flexible connection consisting of U-shaped bolts 9 and 10 engaging openings in the ends of the sling members. This provides a flexible connection at this point. The drive for transmitting power from the towing vehicle to the towed vehicle preferably comprises a pair of sprocket wheels 10 which are mounted on the driving axle of the towing vehicle and made fast to the brake drums thereof. A pair of sprocket wheels 11 with a larger gear ratio are mounted on the axle 8 of the towed vehicle and made fast to the ground wheels thereof through the medium of suitable clips 12. A chain drive consisting of a pair of sprocket chains 13 connects the sprockets 10 and 11.

In order to bind the driving axle of the towing vehicle on the sling members 1 and 2 as well as to enable a suitable adjustment of the chain drive to be had, an important feature of the present invention consists in constructing the sling members with a horizontal axle receiving portion as at 14 on which the driving axle is directly supported in a manner to enable it to be adjusted longitudinally of the horizontal portions of the sling members, whereby the chain drive may be tightened or loosened. The construction employed to enable this adjustment to be obtained preferably comprises a pair of inverted U-shaped yokes 15 engaging one end of the axle on opposite sides of the horizontal portions 14 of the sling members and a pair of like yokes 16 engaging the other end of the axle on opposite sides of the horizontal portion 14 of the other sling member. Each pair of yokes are provided with registering openings which are engaged by bolts at the top and bottom of the horizontal portions and are employed for clamping each pair of yokes together and binding the axle tightly on its support. Suitable set screws are used on each pair of yokes for retaining the yokes in the desired position relative to the horizontal portions. In obtaining the adjustment of the drive the set screws are loosened and the yokes together with the driving axle are adjusted longitudinally of the horizontal portions to tighten or loosen the chain drive as the case may be. This adjustment of the chain drive will, of course, effect the position of the inclined ends of the sling members relative to the frame members 3 and 4. In this connection the U-shaped hanger must necessarily move longitudinally of the frame members 3 and 4 either forwardly or rearwardly depending upon whether the chain drive is to be tightened or loosened.

It is to be noted that the sling members are free to move in a vertical plane by means of their pivoted connection on the towing vehicle and the vehicle to be towed. However, when the structure is once set up, these sling members are held against any horizontal movement which would cause the chain drive to become out of adjustment. The particular arrangement and coöperative relationship of the parts enables the rear end of the towing vehicle to be supported in a manner whereby the shock of vibration may be taken up through the existing springs of the towing vehicle.

I claim:—

1. A combined supporting and coupling structure for connecting a towing vehicle with a vehicle to be towed, comprising a sling member having an axle receiving portion and axle binding yoke associated with said portion adapted to bind an axle thereon, said yoke being horizontally adjustable relatively to said axle receiving portion.

2. A combined supporting and coupling structure for connecting a towing vehicle with a vehicle to be towed, comprising a pair of sling members having upwardly inclined ends and intermediate horizontal axle receiving portions, axle binding yokes associated with said horizontal portions adapted to coact therewith in confining an axle, and means for horizontally adjusting said yokes relative to said horizontal portions comprising means on the yokes engaging the horizontal portions adapted to bind said yokes to said portions.

3. A combined supporting and coupling structure for connecting a towing vehicle with a vehicle to be towed comprising a pair of sling members having upwardly inclined ends and intermediate horizontal portions, adapted to receive the ends of an axle, yokes associated with said intermediate portions and coacting therewith in confining an axle, said sling members adapted to be connected with the rear and front respectively of the towing and towed vehicle, and means for adjusting the yokes longitudinally of the horizontal portions, comprising means on the yokes engaging the horizontal portions, whereby said yokes may be clamped thereto.

4. In combination with an automobile and a vehicle to be towed by said automobile, of a combined supporting and coupling structure, comprising a pair of sling members having upwardly inclined ends, the front ends of which being pivotally connected to the frame of the automobile forward of the rear axle thereof, and the rear ends pivotally connected to the axle of the vehicle to be towed, said sling members also having intermediate horizontal axle receiving portions providing a fulcrum point, and adjustable axle binding yokes associated with said intermediate portions adapted to coact therewith in confining an axle.

5. In combination with an automobile having its driving wheels removed but having a driving axle, and a vehicle to be towed by said automobile having traction wheels, of a combined supporting and coupling structure connecting the automobile with the vehicle to be towed, comprising a pair of sling members having inclined ends, the front ends being pivotally connected to the frame of the automobile forward of the driving axle, the rear ends being connected to the axle of the towed vehicle, said sling members also having intermediate horizontal axle receiving portions providing a fulcrum point, adjustable axle binding yokes associated with said intermediate portions adapted to confine the driving axle of the automobile, said axle having a sprocket wheel mounted thereon, a sprocket wheel mounted on the traction wheel of the vehicle to be towed, and a chain drive connecting said sprockets.

6. In combination with an automobile having its driving wheels removed but having a driving axle, and a vehicle to be towed by said automobile having traction wheels, of a combined supporting and coupling structure connecting the automobile with the vehicle to be towed, comprising a pair of sling members having inclined ends, the front ends being pivotally connected to the frame of the automobile forward of the driving axle, the rear ends of the sling members being connected to the axle of the towed vehicle, said sling members also having intermediate horizontal axle receiving portions providing a fulcrum point, adjustable axle binding yokes associated with said intermediate portions adapted to confine the driving axle of the automobile, said axle having sprocket wheels mounted at its respective ends, a sprocket wheel mounted on each of the traction wheels of the vehicle to be towed and a chain drive connecting said sprocket wheels.

7. A combined supporting and coupling structure for connecting a towing vehicle with a vehicle to be towed, comprising a sling member having an axle receiving portion and an axle binding yoke associated with said portion adapted to bind an axle thereon, said yoke and said axle being longitudinally adjustable relative to said axle receiving portion whereby the space between the towing vehicle and the towed vehicle may be increased or decreased at will.

8. A combined supporting and coupling structure for connecting a towing vehicle with a vehicle to be towed comprising a sling member having an axle receiving portion and an axle binding yoke associated with said portion adapted to bind an axle thereon, a chain drive connecting said axle with the traction wheels of the vehicle to be towed, said axle yoke adapted to be adjusted horizontally of said axle receiving portion whereby the chain drive may be adjusted.

The foregoing specification signed at Nashville, Tennessee this 3rd day of November, 1917.

STERLING OWEN EDMONDS.

Copies of this patent may be obtained for five cents each, by addressing the "Commissioner of Patents, Washington, D. C."